United States Patent [19]

Izawa et al.

[11] Patent Number: 4,492,492

[45] Date of Patent: Jan. 8, 1985

[54] GUIDING METHOD FOR CABLE BURYING DEVICE AND A DEVICE THEREFOR

[75] Inventors: Toshio Izawa, Tokyo; Yoshinao Iwamoto, Fujimi; Yuichi Shirasaki, Tokyo; Kenichi Asakawa, Hachiohji, all of Japan

[73] Assignee: Kokusai Denshin Denwa Co., Ltd., Tokyo, Japan

[21] Appl. No.: 250,264

[22] Filed: Apr. 2, 1981

[30] Foreign Application Priority Data

Sep. 22, 1980 [JP] Japan ............................... 55-130610

[51] Int. Cl.³ ........................... F16L 1/04; G01S 5/18; G01S 15/06
[52] U.S. Cl. .................................. 405/160; 405/175; 441/133; 367/19
[58] Field of Search ............... 405/157, 160, 175, 171, 405/172; 367/19, 2, 6, 106, 127; 441/133; 175/45

[56] References Cited

U.S. PATENT DOCUMENTS

| | | | |
|---|---|---|---|
| 2,373,439 | 4/1945 | Wheatley | 405/157 X |
| 2,993,203 | 7/1961 | Hulst | 367/127 X |
| 3,267,417 | 8/1966 | Galloway | 367/6 |
| 3,273,346 | 9/1966 | Delaruelle et al. | 405/171 X |
| 3,757,370 | 9/1973 | Seno et al. | 441/133 |
| 3,803,541 | 4/1974 | Shiroyama et al. | 367/106 |
| 4,025,895 | 5/1977 | Shatto | 367/106 |
| 4,037,189 | 7/1977 | Bell et al. | 405/157 X |
| 4,063,430 | 12/1977 | Lamy | 405/171 |
| 4,087,780 | 5/1978 | Itria et al. | 367/19 X |
| 4,120,167 | 10/1978 | Denman et al. | 405/157 |
| 4,127,006 | 11/1978 | Oosterkamp | 405/171 |

Primary Examiner—James A. Leppink
Assistant Examiner—Beverly E. Hjorth

[57] ABSTRACT

The present invention aims at providing a method and a device for guiding the cable burying device along the cable effectively as well as accurately even if the cable should be reburied after repairment. The present invention is mainly characterized in that an ultrasonic command signal transmitted from an ultrasonic transmitter/receiver mounted upon the cable burying device is received by an ultrasonic, transponder which has been mounted on the cable. An ultrasonic signal is transmitted in turn from said ultrasonic transponder to be received by said ultrasonic transmitter/receiver so that the position of said ultrasonic transponder on the cable is detected by processing such signals. The present invention is further characterized in that four ultrasonic wave receiving elements are arranged in a square form and in parallel with a horizontal face in the cable burying device, that an ultrasonic transmitter/receiver element is provided at the center of the square, that a support frame is mounted on the outer periphery of the cable, that a rotating member is provided to be freely rotatable via bearings on the outside of the support frame, that an ultrasonic wave transmitter/receiver element is provided on said rotating member.

2 Claims, 8 Drawing Figures

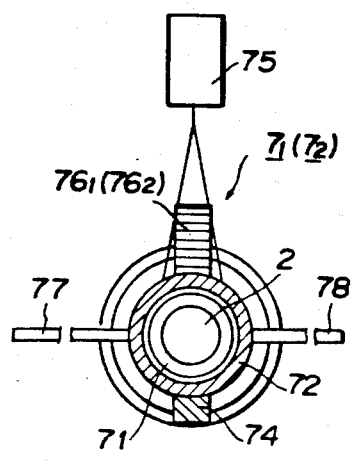
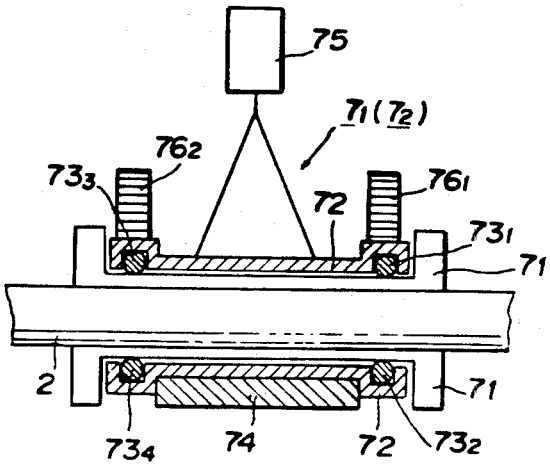
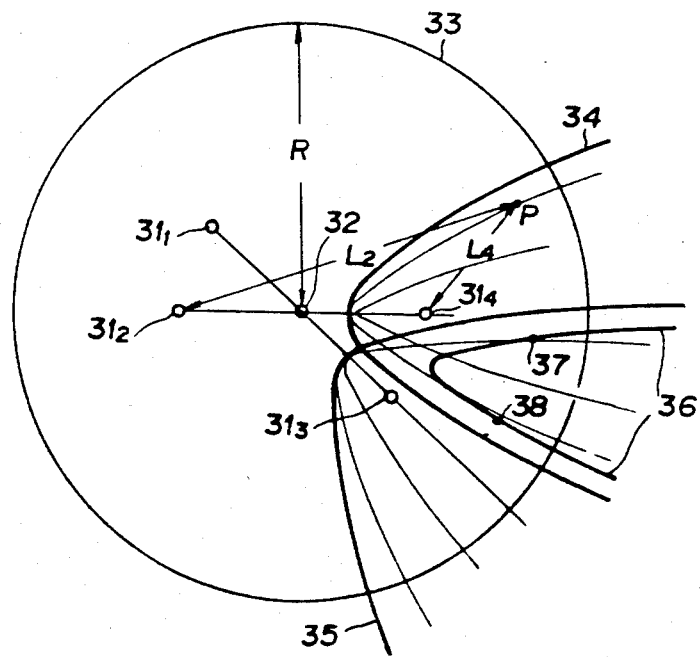

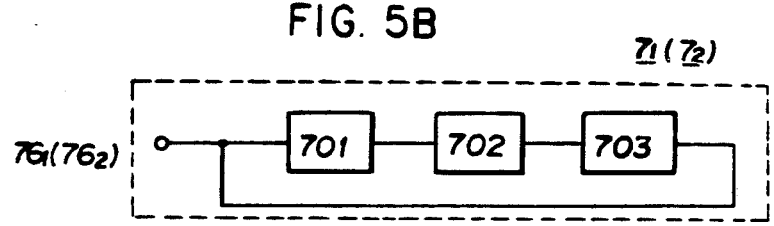
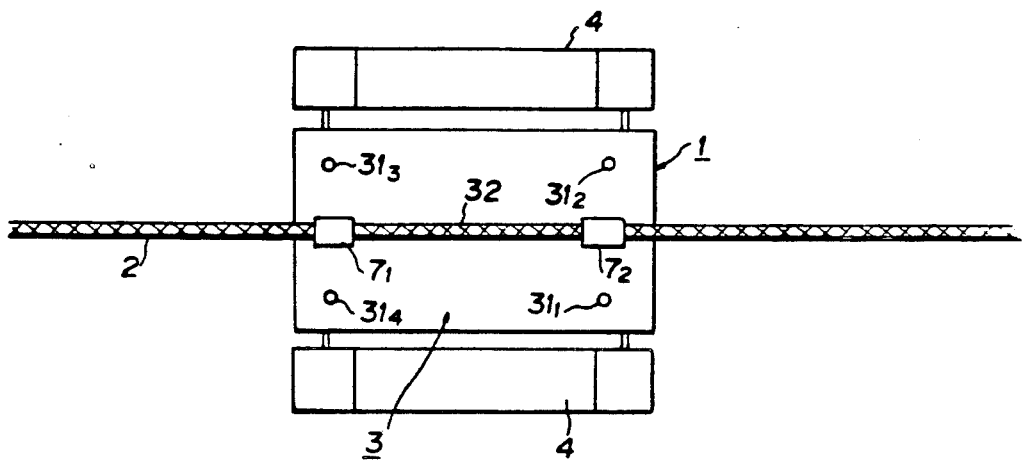

GUIDING METHOD FOR CABLE BURYING DEVICE AND A DEVICE THEREFOR

BACKGROUND OF THE INVENTION

The present invention concerns a method to guide a cable burying device effectively as well as accurately along a cable and a device for a cable burying device which buries communication cables or electric cables in the marine bed in order to protect such cables from damages caused by anchors of ships or fishing tools.

In the prior art, when a cable is needed to be buried in the marine bed, the cable is laid and at the same time buried by a burying device which is being tugged by a mother ship. In such a conventional method, the cable is made to be embraced in the burying device on the ship and then the burying device is lowered underwater to the bottom. While the burying device is tugged by the mother ship, an excavation device provided on the burying device excavates a groove on the marine bed and a cable is simultaneously laid and buried in the groove. This method is superior in operability and efficiency for the case to newly lay and bury a cable on the marine floor; however, it has drawbacks when it is applied for such a case that a part of the buried underwater cable is damaged and after such a faulty portion has been repaired aboard the mother ship, the repaired portion is to be re-buried. Since the burying device should be guided along the cable with a high accuracy, a special mother ship with an excellent operational performance is required for such occasions. Further, it is difficult to properly catch and bury the cable because the laid cable tends to take a zigzag course due to tidal currents etc., rather than a straight line. In the prior art, therefore, a considerable length of the cable had to be left unburied. The method has further drawbacks since the burying device is lowered to the bottom floor by ropes after the cable is fed to the device on board of a ship, such ropes tend to be tangled with the cable due to the tidal currents, which not only stops the operation but also damages the cable.

SUMMARY OF THE INVENTION

The present invention focuses upon such drawbacks of the conventional devices and aims at providing a method and a device for guiding the cable burying device along the cable effectively as well as accurately even if the cable should be reburied after repairment. The present invention is mainly characterized in that an ultrasonic command signal transmitted from an ultrasonic transmitter/receiver mounted upon the cable burying device is received by an ultrasonic transponder which has been mounted on the cable. An ultrasonic signal is transmitted in turn from said ultrasonic transponder to be received by said ultrasonic transmitter/receiver so that the position of said ultrasonic transponder on the cable is detected by processing such signals. The invention is further characterized in that the position of said ultrasonic transponder on the cable can be detected by measuring the intersection of the hyperboloids which is obtained by measuring the time differentials between the respective times needed for ultrasonic signals transmitted from said ultrasonic transponder to arrive at two crossing ultrasonic receiver elements of the four ultrasonic receiving elements and by measuring the time needed for reciprocating the ultrasonic signals between the ultrasonic transmitter/receiver element of the ultrasonic transmitter/receiver and the ultrasonic transponder provided upon the cable burying device. The present invention is moreover characterized in that four ultrasonic wave receiving elements are arranged in a square form and in parallel with a horizontal face in the cable burying device, that an ultrasonic transmitter/receiver element is provided at the center of the square, that four ultrasonic wave transmitter/receiver elements are made to form a rectangular form and an ultrasonic transmitter/receiver element is provided at the center thereof, that the distance between the two ultrasonic transponder mounted on the cable is made to be substantially similar to the distance between said ultrasonic wave receiving elements which form parallel sides of the rectangle, that above mentioned respective elements are provided underneath the body of the cable burying device, that a support frame is mounted on the outer periphery of the cable, that a rotating member is provided to be freely rotatable via bearings on the outside of the support frame, that an ultrasonic wave transmitter/receiver element is provided on said rotating member and that an anchor and a buoy are provided on the rotating member to be symmetrical to each other in respect of the cable.

A guiding method and the device therefor according to the present invention will now be described referring to an preferred embodiment indicated in the attached drawings.

BRIEF DESCRIPTION OF THE DRAWINGS

FIG. 4 is a diagram to explain the principle of detecting the position of the cable according to the present invention.

FIG. 6 is a bottom view to illustrate another embodiment of the ultrasonic transmitter/receiver.

DETAILED DESCRIPTION OF PREFERRED EMBODIMENT

Figure 1:
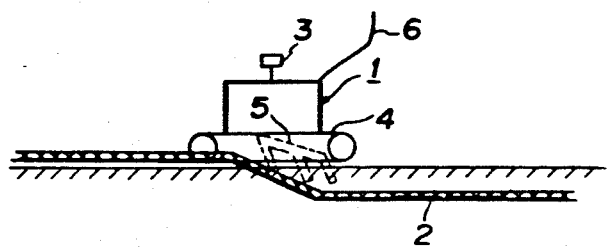
FIG. 1 is a schematic view to illustrate the whole structure of the cable burying device.

FIG. 1 is a schematic view to illustrate the whole structure of the cable burying device 1, indicating a state in which a cable 2 that has been laid on the bottom of a water body is being buried thereinto by the cable burying device 1. In the cable burying device 1 is provided an ultrasonic transmitter/receiver 3 as a device to confirm the position of the cable. The position of the cable 2 is confirmed by the data obtained from said ultrasonic transmitter/receiver 3. The device thus can be guided to run along the cable 2 by driving a travelling member 4, for instance, an endless track, to excavate a groove into the bottom of the water body with a water-jet type excavation device 5 which is driven by, for instance, an underwater pump. The cable 2 is to be buried in the groove. The energy (electric power) and the control signals required for above-mentioned devices are supplied from the mother ship (not shown) through a control cable 6.

Figure 2:
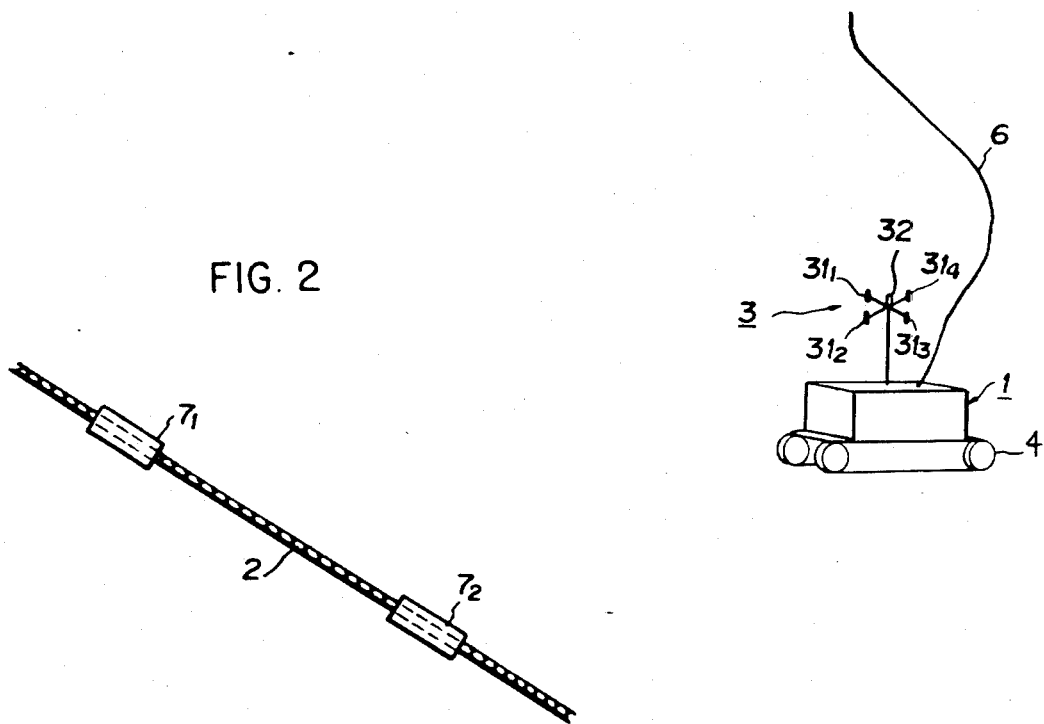
FIG. 2 is a schematic view to show the ultrasonic wave transmitter/receiver as a cable position confirmation device to be used in guiding the cable burying device to the cable; and, FIG. 3 indicates an embodiment of the ultrasonic transponder to be mounted on the cable in advance wherein FIG. (a) is a frontal crosssectional view and (b) a side crosssectional view.

FIG. 2 is a schematic view to illustrate that the cable burying device 1 is guided to the cable 2 by using the ultrasonic transmitter/receiver 3 as the cable position confirmation device. The cable 2 is provided with two ultrasonic transponders $7_1$ and $7_2$. Since the said ultrasonic transponders $7_1$ and $7_2$ have transmitters and receivers for ultrasonic wave signals, they are made to transmit ultrasonic signals when they receive ultrasonic transmission command signals. An ultrasonic signal transmitted from the ultrasonic transponder $7_1$ can be distinguished from that transmitted from the other transponder $7_2$ by a simple method, such as, to use the transmission command signals of frequencies different from each other so that respective filters mounted inside the ultrasonic transponders $7_1$ and $7_2$ may discriminate a transmission command to transmit ultrasonic signals from either one of the ultrasonic transponders $7_1$ and $7_2$.

The ultrasonic transmitter/receiver 3 which is provided on the cable burying device 1 as a cable position confirming device comprises four ultrasonic wave receiving elements $31_1$ to $31_4$ arranged in a plane parallel to the horizontal surface and in a square form and an ultrasonic transmitter/receiver element 32 located at the center of the square thereof. When a transmission command of ultrasonic wave signal is transmitted from said ultrasonic transmitter/receiver element 32 to either one of the ultrasonic transponders $7_1$ and $7_2$, ultrasonic signals are transmitted in turn from either one of the ultrasonic transponders $7_1$ and $7_2$ to be received and processed by the ultrasonic wave receiving elements $31_1$ to $31_4$ and the ultrasonic transmitter/receiver element 32, thereby enabling the detection of the position of either one of the ultrasonic transponders $7_1$ and $7_2$ according to the position measurement principle which is explained hereinafter. The information concerning the position is supplied to the mother ship through the control cable 6 to be used as a data for guiding the cable burying device along the cable 2.

FIG. 3 indicates an preferred embodiment of the ultrasonic transponders $7_1$ and $7_2$ which are mounted on the cable wherein FIG. (a) is a frontal view and (b) is a cross-sectional side view. A support frame 71 of a cylindrical form is mounted on the cable 2 and a rotating member 72 is mounted around the support frame 71 via bearings $73_1$ to $73_4$ in a freely rotatable fashion. An anchor 74 and a buoy 75 are provided on the rotating member 72 in parallel to each other in respect of the cable 2. The rotating member 72 is further provided with ultrasonic transmitter/receiver elements $76_1$ and $76_2$ and an ultrasonic wave absorbing board or an ultrasonic wave diffusing board 78 to avoid the influence of the ultrasonic waves reflected from the bottom. The ultrasonic transmitter/receiver elements $76_1$ and $76_2$ are made to constantly come above the cable 2 by the anchor 74 and the buoy 75 provided on the rotating member 72. In this embodiment a power source and electric circuits are provided within a buoy to minimize the volumes of the ultrasonic transponders $7_1$ and $7_2$ mounted on the cable 2.

FIG. 4 schematically explains the principle of calculating the position of the cable according to the present invention. If it is assumed that the velocity of propagation of ultrasonic signals is C and that the time $\tau_1$ required for the ultrasonic signals to reciprocate between the ultrasonic transmitter/receiver element 32 of the ultrasonic transmitter/receiver 3 mounted on the cable burying device 1 and either one of the ultrasonic transponders $7_1$ and $7_2$ (excluding known time lag caused by a signal processing circuit etc.), the following formula holds for the distance R between the ultrasonic transmitter/receiver element 32 and either one of the ultrasonic transponders $7_1$ and $7_2$;

$$R = C \cdot (\tau_1/2)$$

More specifically, the ultrasonic transponder $7_1$ or $7_2$ is positioned on the surface of a sphere 33 having a radius R and having the center at the position of the ultrasonic transmitter/receiver element 32. If it is assumed that a point P is arbitrarily selected within this space, and that the distances between the arbitrary point P and the ultrasonic wave receiver elements $31_2$ and $31_4$ are $L_2$ and $L_4$ respectively, a set of the points P collectively expresses a hyperboloid if the difference between $L_2$ and $L_4$, $\Delta L (= L_2 - L_4)$, is made constant. If the difference in the times required for an ultrasonic signal transmitted from either one of the ultrasonic transponders (oscillators) $7_1$ or $7_2$ to arrive at the ultrasonic receiving elements $31_2$ and the other element $31_4$ is $\tau_2$, then the difference in the distances between said ultrasonic transponders (oscillators) $7_1$ or $7_2$ and said ultrasonic receiving elements $31_2$ and $31_4$ is expressed by the following formula of $$\Delta L_2 = c \tau_2$$

Therefore, said ultrasonic transpoder (oscillator) $7_1$ or $7_2$ is known to exist on a hyperboloid 34 where said difference $\Delta L$ of distances will have the relation expressed by the following formula;

$$\Delta L = \Delta L_2$$

In a similar method, by measuring the difference in times needed for receiving signals by the element $31_1$ and $31_3$ which are positioned on the diagonal line among other ultrasonic wave receiving elements $31_1$ to $31_4$, a hyperboloid 35 is obtained. Suppose the intersecting points of a hyperbola 36 which is intersecting points made by the hyperboloids 34 and 35 with the sphere 33 are 37 and 38 respectively, the ultrasonic transponder $7_1$ or $7_2$ comes to be positioned on the intersection point 37 or 38. The intersecting points 37 and 38 exist at a position symmetrical to the plane formed by the ultrasonic wave receiving elements $31_1$ to $31_4$. In the preferred embodiment indicated in FIG. 2, the ultrasonic transmitter/receiver element 32 is positioned above the body of the cable burying device 1 and the plane formed by the ultrasonic wave receiving elements $31_1$–$31_4$ is arranged substantially parallel to the bottom of the water body; therefore, the intersecting points 37 and 38 come to be positioned above and under this plane respectively. If the cable 2 is laid upon the marine bed and the slope thereon is gradual, the ultrasonic transponder comes to be positioned on the lower intersecting point.

Figure 5A:
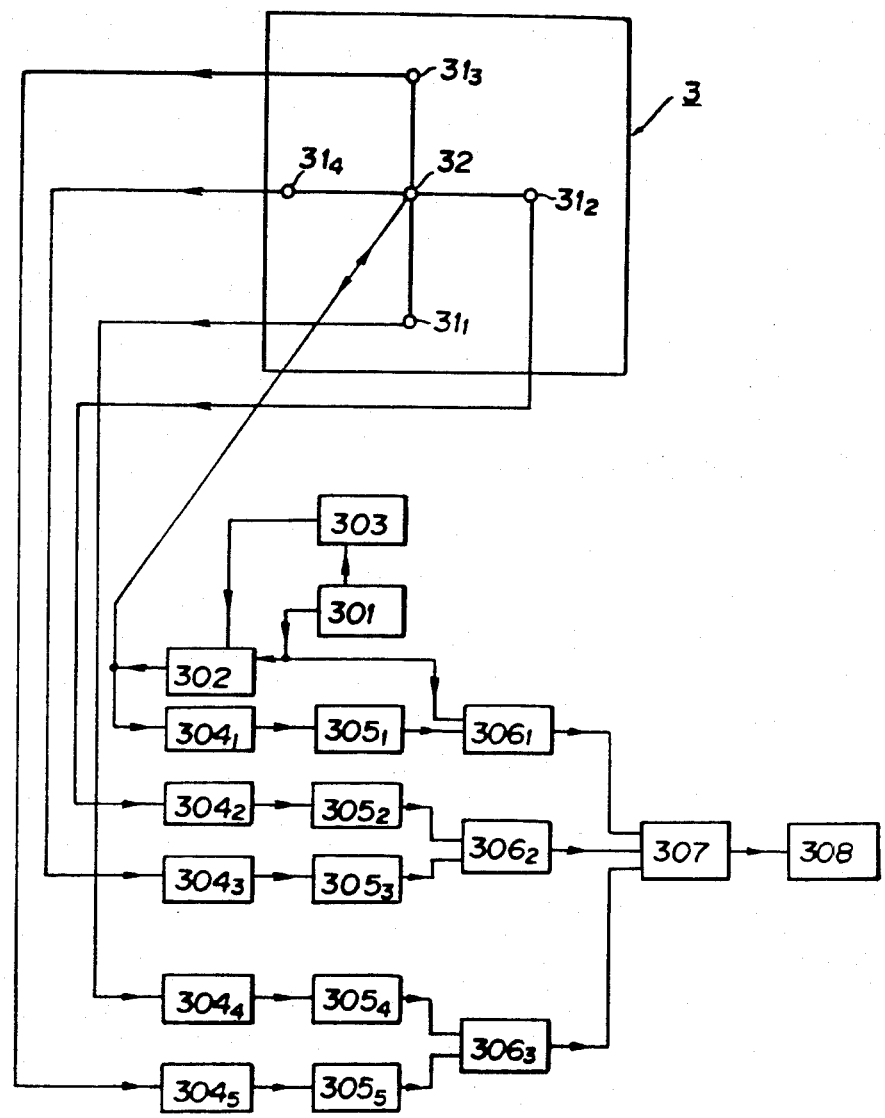
FIGS. 5(a) and (b) are block diagrams to indicate an example in processing signals generated from the ultrasonic transmitter/receiver and the ultrasonic transponder according to the present invention.

FIG. 5 is a block diagram to illustrate an embodiment related to the processing of the signals generated from the ultrasonic transmitter/receiver 3 which is explained in (a) and the ultrasonic transponders $7_1$ and $7_2$ which is explained in (b).

In (a) when a pulse signal is generated from a pulse generating circuit 301 to command transmission of a transmission command signal in ultrasonic wave signals, a signal is transmitted from a voltage control type transponder 302 to be converted into an ultrasonic wave signal by the ultrasonic transmitter/receiver element 32. It has been described hereinabove that the frequencies of the transmission command signals in ultrasonic waves to the ultrasonic transponders $7_1$ and $7_2$ are made different from each other in order to discriminate the ultrasonic transmission command signal to the ultrasonic transmitter $7_1$ from that to $7_2$. Such frequencies can be controlled by controlling the frequency generated from the voltage control type transponder 302 by the control circuit 303. When a transmission command signal of ultrasonic wave is transmitted from the ultrasonic transmitter/receiver 32, an ultrasonic signal is transmitted in turn from either one of the ultrasonic transponders $7_1$ or $7_2$. This return signal is converted into an electric signal by the ultrasonic wave receiving elements $31_1$ to $31_4$ and the ultrasonic transmitter/receiver element 32, and after it is amplified in the amplifier circuits $304_1$ to $304_5$ of narrow band, converted into a square wave in the waveform shaper circuits $305_1$ to $305_5$. Then, the time difference measuring circuits $306_1$ to $306_3$ measure the time $\tau_1$ needed for reciprocating ultrasonic signals between the ultrasonic transmitter/receiver element 32 and either one of the ultrasonic transponders $7_1$ to $7_2$, the difference $\tau_2$ in times needed for an ultrasonic signal generated from the ultrasonic transponder $7_1$ or $7_2$ to arrive at the ultrasonic receiving elements $31_2$ and $31_4$, and the difference $\tau_3$ in times between the ultrasonic wave receiving elements $31_1$ and $31_3$. The results are processed in a calculation circuit 307 to display the positions of the ultrasonic transponders $7_1$ and $7_2$ on an indicator 308.

In (b), on the other hand, a transmission command signal in ultrasonic wave is received by the ultrasonic transmitter/receiver elements $76_1$ and $76_2$, amplified by the narrow band amplifier circuit 701 and wave-shaped in a waveform shaper circuit 702. Signals are further generated from the voltage control type transponder circuit 703 so as to be converted into ultrasonic wave signals by the ultrasonic transmitter/receiver elements $76_1$ and $76_2$.

FIG. 6 is a bottom view to illustrate another embodiment of the ultrasonic transmitter/receiver 3 which is used as a cable position confirmation device in the present invention. In this embodiment the ultrasonic wave receiving elements $31_1$ to $31_4$ are mounted underneath the lower part of the body of the cable burying device 1 in a rectangular arrangement while the ultrasonic transmitter/receiver element 32 is mounted at the center of the rectangular form. Accordingly, since in this embodiment the elements $31_1$ to $31_4$ and 32 can be positioned closer to the ultrasonic transponders $7_1$ and $7_2$ which have been mounted on the cable 2, the positions of the ultrasonic transponders can be calculated with a higher accuracy. The distance between the ultrasonic transponders $7_1$ and $7_2$ which have been mounted on the cable is made substantially the same to the distance between the ultrasonic wave receiving elements $31_1$ and $31_4$ or that between $31_2$ and $31_3$ which constitute parallel sides. Therefore, by controlling the travelling device 4 of the cable burying device 1 so as to position the ultrasonic transponders $7_1$ and $7_2$ at positions immediately beneath the point bisecting the length of a line connecting the ultrasonic receiving elements $31_1$ to $31_2$ or $31_3$ to $31_4$, the cable burying device 1 can be guided to come directly above the cable 2 and to align the advancing direction thereof with that of the cable 2.

A signal processing system similar to the one shown in the block diagram in FIG. 5 may be used as the signal processing system for the ultrasonic transmitter/receiver elements according to the present invention. Although in the description of the preferred embodiments hereinabove, there has been used the system wherein the ultrasonic transponders $7_1$ and $7_2$ receive ultrasonic wave transmission command signals and transmit ultrasonic signals, it may be a system wherein ultrasonic signals are transmitted in burst. In such a case, the ultrasonic transponders $7_1$ and $7_2$ are made to have frequencies different from each other and some of the ultrasonic receiving elements, for instance, $31_3$ and $31_4$ are made to correspond to the ultrasonic transponder $7_1$ while $31_2$ and $31_1$ are made to correspond to the other ultrasonic transponder $7_2$. The processing circuit for the received signals comprises circuits respectively assigned to calculate respective time difference.

As described in detail hereinabove referring to the preferred embodiments indicated in the attached drawings, the present invention enables to accurately guide a cable burying device along a cable even if the water is too turbid to lead the cable burying device by using an underwater TV camera. Since two ultrasonic transponders are mounted on the cable from the start of the operation, the present invention enables to detect not only the position of the cable but also the form and shape of the cable track.

We claim:

1. A cable position confirming device for a cable burying device comprising four ultrasonic receiving elements arranged in the form of a rectangle on the cable burying device in a plane beneath the cable burying device and parallel to a horizontal surface thereof, an ultrasonic transmitter/receiver element provided at the center of said rectangle, and two ultrasonic transponders mounted on a cable to be buried by said cable burying device, said elements being used descriminatingly to receive ultrasonic signals transmitted by said two ultrasonic transponders in response to ultrasonic transmission command signals transmitted by said transmitter/receiver element, the distance between pairs of said receiving elements forming parallel sides of said rectangle being substantially equal to the distance between said two ultrasonic transponders, whereby to facilitate accurate measurement of the position of the cable.

2. An ultrasonic transponder to be mounted on a cable and cooperable with a cable position confirming device for a cable burying device, said transponder comprising a support frame mounted on the outer periphery of the cable, a rotatable member mounted on said support frame on bearings in a freely rotatable manner, an ultrasonic transmitter/receiver element provided on said rotatable member, and an anchor and a buoy provided on said rotatable member in a symmetrical arrangement with respect to the cable, whereby to direct the rotation of said rotatable member so that said transmitter/receiver element will constantly be above the cable.

* * * * *